Figure 1:
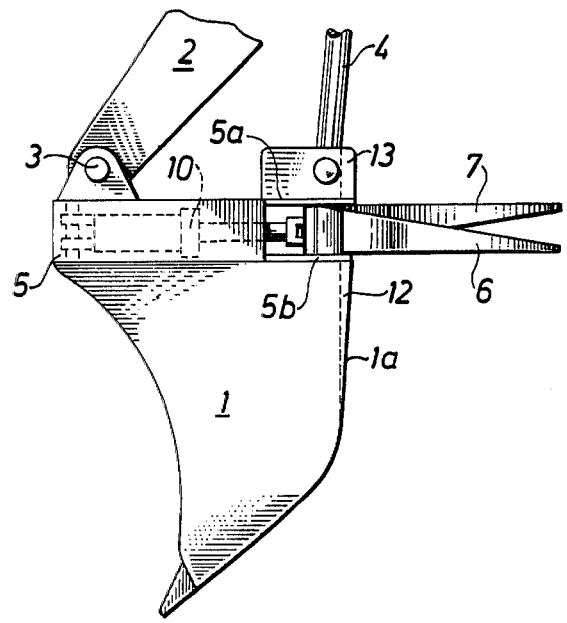

United States Patent [19]

Sonerud

[11] 4,297,799
[45] Nov. 3, 1981

[54] APPARATUS FOR DIGGING POST HOLES AND ERECTING POSTS

[75] Inventor: John T. Sonerud, Hudiksvall, Sweden

[73] Assignee: Soneruds Maskin Aktiebolag, Hudiksvall, Sweden

[21] Appl. No.: 124,640

[22] Filed: Feb. 25, 1980

[51] Int. Cl.³ .............................................. A01B 13/00
[52] U.S. Cl. .................................... 37/2 R; 37/117.5; 414/729
[58] Field of Search ............. 37/2 R, 2 P, 103, 117.5, 37/DIG. 3; 414/487, 722, 729; 254/1

[56] References Cited

U.S. PATENT DOCUMENTS

| | | | |
|---|---|---|---|
| 2,387,656 | 10/1945 | Gledhill | 37/117.5 |
| 3,057,599 | 10/1962 | Clatterbuck | 37/2 R X |
| 3,116,048 | 12/1963 | Irwin et al. | 37/2 R X |
| 3,323,234 | 6/1967 | Pickrell | 37/103 |
| 3,702,712 | 11/1972 | Cairns | 37/117.5 X |
| 3,739,823 | 6/1973 | Bartell | 37/2 R |
| 3,997,068 | 12/1976 | Lock | 37/117.5 |
| 4,070,772 | 1/1978 | Motomura et al. | 37/117.5 |
| 4,204,348 | 5/1980 | Lydie | 37/117.5 |

FOREIGN PATENT DOCUMENTS

| | | | |
|---|---|---|---|
| 605714 | 9/1960 | Canada | 37/2 R |
| 7714027 | 7/1979 | Sweden | 37/2 R |
| 880567 | 10/1961 | United Kingdom | 37/2 R |
| 293941 | 3/1971 | U.S.S.R. | 37/117.5 |

*Primary Examiner*—E. H. Eickholt
*Attorney, Agent, or Firm*—Daley & Brandt

[57] ABSTRACT

An apparatus for digging post holes and erecting posts is disclosed. A post hole digging shovel (1) is provided with pivotably mounted gripping arms (6, 7) gripping around a post. Two recesses (12, 13) in the shovel form a seat for the post when gripped by said arms.

4 Claims, 2 Drawing Figures

APPARATUS FOR DIGGING POST HOLES AND ERECTING POSTS

The present invention relates to apparatus for digging post holes and erecting posts.

In line stringing, e.g. for overhead power or telecommunication, it is usual first to dig the holes for the posts or poles, carrying the lines, and then erect the poles manually. This manual erection is heavy and hazardous work, for which reason it has in recent times been replaced by machine erection, involving erecting the poles with the aid of a gripper mounted on a powered implement. This implement is often the same machine as is used for excavating the post holes. Even if the same machine can be utilized for both excavation and erection, it has been found that the manual work will neither be easier or less time-consuming, since the gripper has so far been fitted in place of the excavating tool or shovel. When the post is to be erected after having had its hole dug, the shovel must be taken off the machine and replaced by the gripper. When further excavation is to be done, the gripper must be removed before the shovel can be fitted. Futhermore, the removed tool (shovel or gripper) must be moved between different sites.

One object of the present invention is therefore to obviate the disadvantages of previously known apparatus of the kind described above, and provide a simple, reliable and robust apparatus, which without any manual work with dismantling, fixing or moving tools can excavate post holes, erect poles by gripping them and firmly maintaining them in position while their attitude is being temporarily fixed, as well as filling back around the pole.

This object is accomplished by the invention being given the characterizing features disclosed in the following patent claims.

Figure 2:
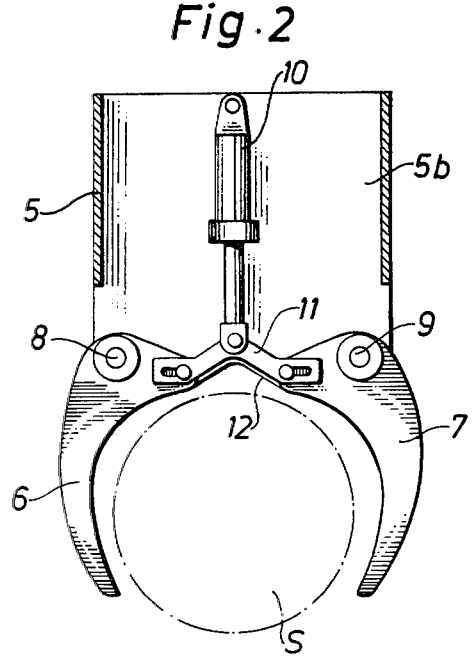

A preferred embodiment of the invention will now be described in detail while referring to the accompanying drawing on which FIG. 1 is a side view of the apparatus in accordance with the invention, and FIG. 2 is a view seen from above, and partly in section, of the apparatus in FIG. 1, the gripping arms of the apparatus being depicted partially opened out.

The combined excavating and gripping apparatus illustrated in the figure comprises a shovel 1, pivotably mounted at 3 on an excavator boom 2. The swinging movement described by the shovel 1 is provided by a link 4, pivotably mounted at either end between the shovel and arm, the motion of the link being conventionally controlled from the driver's cabin of the machine. In the upper part of the shovel 1 there is a space defined by a casing 5, said space being open substantially solely towards the rear of the shovel 1. Between the casing 5 upper wall 5a and its bottom wall 5b, which forms the upper side of the shovel 1, there are two gripping arms 6 and 7 at the rear portion of the bucket, the arms being journalled on two mutually opposing shaft stubs 8 and 9 so that their outer free ends can swing towards and away from each other. The inner portions of the arms 6 and 7 are formed for coaction with a schematically illustrated mechanical/hydraulic force transfer system which includes a pressurized fluid piston/cylinder means 10 with associated linkage 11, suitably mounted in the casing 5. In order that the arms 6 and 7 can be swung into their retracted positions in the casing 5, in spite of the stubs 8 and 9 being situated opposite each other, the upper side 6a and under side 7b of the respective arm are situated with the necessary clearance therebetween along the same sloping plane.

The rear portion of the bucket 1 is provided with a spine 1a having along the middle of it a V-shaped recess 12, illustrated in FIGS. 1 and 2. The attachment boss for the link 4 at the rear portion of the bucket is also provided with a V-shaped recess 13, of substantially the same shape as the recess 12. The recesses 12 and 13 form together a seat for the post which is to be erected, and can be provided with friction-increasing means.

With operation from the driving cabin of the excavator, the arms 6 and 7 have been retracted into the casing 5 by means of the mechanical/hydraulic force transfer system before digging a hole is started. The arms 6 and 7 do not project outside the spine 1a of the shovel 1, and therefore in this position they do not hinder excavation work, and since the system and the arms are enclosed by the casing 5, they are not damaged during excavation, even if the ground is hard and stony. Clay, earth etc. are also prevented from coming into the casing 5 and causing disturbances in the operation of the gripping apparatus.

When a hole has been dug, the driver then operates controls in the cabin for causing the force transfer system to swing the free ends of the arms 6 and 7 out and away from each other so that the distance between them exceeds the diameter of a pole S intended for erection. Controls in the cabin are then actuated to move the arms into a gripping position around the pole, close to its centre of gravity, for gripping the pole, when the recesses 12 and 13 in the spine 1a of the shovel and in the attachment boss for the link 4, respectively, come into engagement against the cylindrical surface of the pole. As a result of its engagement against the recesses 12 and 13 and the force in the arms 6 and 7, the pole S will be firmly located in the tool and engaging therewith with a large surface above as well as below the arms, retaining stability thus being great.

The pole S is then raised to a substantially vertical attitude, its lower end inserted into the hole and temporarily fixed into position. After the force transfer system has once again been actuated so that the arms have released their grip on the pole and have been removed from around it, the system is once again actuated so that the arms are retracted into their position inside the casing 5. The hole is subsequently filled and tamped down with the aid of the shovel 1.

Although only one embodiment of the invention has been described and illustrated, it will be seen that the invention is not limited thereto, but is only limited by what is disclosed in the following patent claims.

I claim:

1. Apparatus for digging post holes and erecting posts or poles, characterized by a post hole digging shovel (1) on which there is pivotably mounted gripping means (6, 7) for gripping a post and consisting of at least one gripping arm (6, 7), the shovel having a spine (1a) which is provided with a substantially V- or U-shaped recess (12) forming a seat for the pole, the gripping means (6, 7) being arranged above said spine.

2. Apparatus as claimed in claim 1, characterized by a further recess (13) in said shovel which is substantially V- or U-shaped, and which is situated substantially in line with said first recess (12) but on the other side of the gripping means (6, 7) so as to form with the first-mentioned recess a seat for reception of said post.

3. Apparatus as claimed in claim 1, characterized in that the gripping means (6, 7) comprises two gripping arms (6, 7) mounted on the shovel (1), and such that the free ends of said arms are swingable away from and towards each other and that said arms being receivably retractable into a casing (5) on the shovel.

4. Apparatus as claimed in claim 3, characterized in that the gripping arms (6, 7) are connected to a mechanical/hydraulic force transfer means including at least one piston/cylinder means (10) with associated linkage inside said casing (5).

* * * * *